May 27, 1952 M. SEPELAK 2,597,957

RECORDING TELEPHONE

Filed Oct. 14, 1950

INVENTOR.
Michael Sepelak.
BY
W. B. Harpman
ATTORNEY.

Patented May 27, 1952 2,597,957

UNITED STATES PATENT OFFICE 2,597,957

RECORDING TELEPHONE

Michael Sepelak, New Castle, Pa.

Application October 14, 1950, Serial No. 190,209

3 Claims. (Cl. 179—6)

This invention relates to a recording telephone and more particularly to a device for initiating a telephone recording.

The principal object of the invention is the provision of a recording telephone.

A further object of the invention is the provision of a device for actuating a telephone handset so as to permit a recording to be made from the receiver thereof.

A still further object of the invention is the provision of a device on which a telephone instrument may be positioned and incorporating means for automatically lifting the receiver portion of the telephone instrument to enable a recording to be made therefrom.

A still further object of the invention is the provision of a telephone recording instrument incorporating a recording mechanism and apparatus driven therefrom for elevating the handset of a telephone instrument when the recording mechanism is in operation so that a recording can be made from the receiver portion of the instrument.

The recording telephone disclosed herein comprises an apparatus which may be formed in conjunction with a telephone instrument or used in conjunction with an existing telephone instrument. The apparatus comprises essentially a recording mechanism and means in operative connection therewith and responsive thereto for raising and lowering the receiver portion of the telephone instrument so as to permit a recording to be made therefrom.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
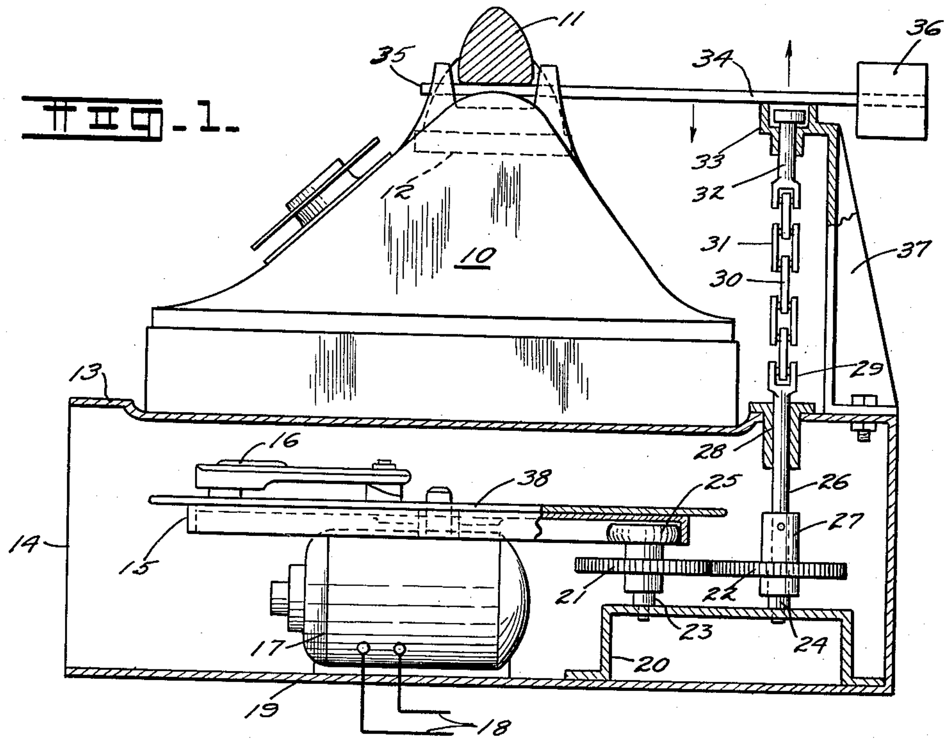
Figure 1 is a side view of the recording telephone with parts broken away and parts in cross section.

By referring to the drawings and Figure 1 in particular it will be seen that a telephone instrument of the handset type is generally indicated by the numeral 10 and it includes a receiver-transmitter unit 11, the receiver portion thereof being shown in dotted lines and indicated by the numeral 12. The telephone instrument 10 is illustrated as being positioned on the upper surface of a cabinet 13 which is open at its front end 14 and encloses a turntable 15, a combination recording head and pickup 16 and a motor 17 for driving the turntable 15. Circuit wires 18 are provided to energize the recording motor 17 and these may obviously be controlled by suitable electric switches (not shown).

The cabinet 13 includes a base 19 and encloses an elevated portion 20 of the base 19 which in turn positions a pair of gears 21 and 22 by means of suitable bearings 23 and 24. The gear 21 is positioned on a shaft, the uppermost portion of which also carries a rubber spool 25 engaged against the periphery of the turntable so that motion of the turntable is imparted by the rubber spool 25 to the gear 21. The gear 22 is in mesh with the gear 21 and has a vertically extending shaft 26 positioned in a socket 27 on its upper surface. The shaft 26 extends upwardly through an opening 28 in the upper surface of the cabinet 13 and immediately behind the telephone instrument 10.

The uppermost end of the shaft 26 is bifurcated as at 29. A series of links 30 and 31 interconnect the shaft 28 with a secondary shaft 32 which is revolvably positioned in a socket 33 formed on an arm 34, an end 35 of which is bifurcated and positioned beneath the combination receiver-transmitter unit 11 of the telephone instrument and the other end of which is provided with a counterweight 36 of a weight equal to the weight of the combination receiver-transmitter unit 11 of the telephone instrument.

The arm 34 is normally held in the position illustrated in Figure 1 of the drawings by a supporting bracket 37 which is positioned on the cabinet 13 and the links 30 and 31 are so arranged that upon revolving motion being imparted the shaft 26 from the turntable 15, as heretofore described, the links will assume longitudinal alignment and thereby move the arm 34 upwardly sufficiently to lift the combination transmitter-receiver unit 11 of the telephone instrument so as to open the telephone line circuits to the transmitter-receiver unit.

Figure 2:
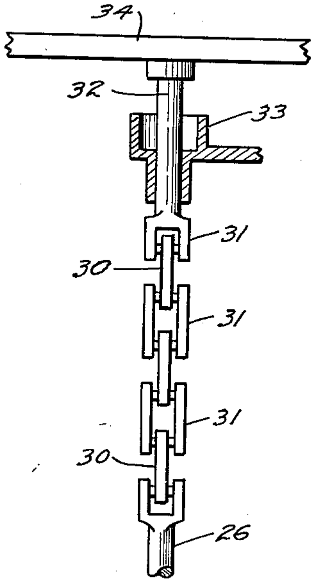
Figure 2 is an enlarged detailed elevation of a portion of the apparatus shown in Figure 1.

By referring to Figure 2 of the drawings an enlarged detailed view of the links 30 and 31 interconnecting the shafts 26 and 32 may be seen as the same normally exist when the shaft 26 is stationary.

Figure 3:
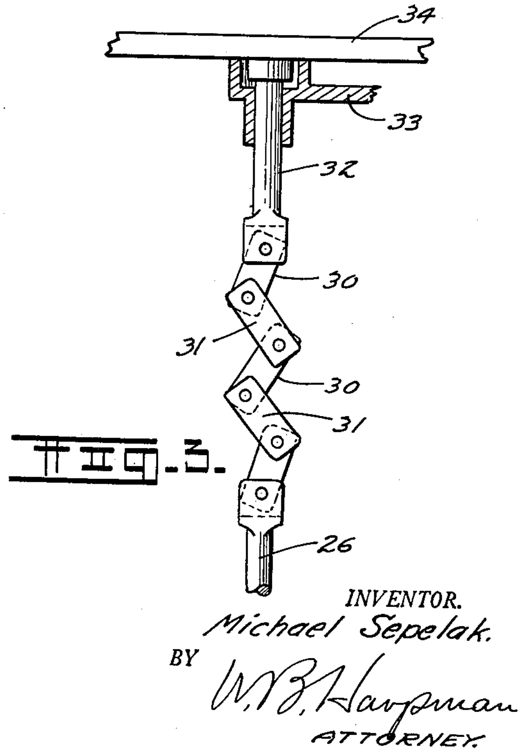
Figure 3 is an enlarged detail of the portion of the apparatus shown in Figure 2 showing the same in extended position.

In Figure 3 of the drawings the links 30 and 31 may be seen in the longitudinal alignment they assume when rotating motion is imparted the shaft 26 and therefore the lowermost one of the links 30. The secondary shaft 32 is positioned in the socket 33 on the arm 34 in such a manner that considerable friction exists when the same is rotated. Its normal action is therefore to oppose the rotation of the links 30 and 31, which action results in the links assuming their longitudinal alignment, as best shown in Figure 3 of the drawings, whereby the arm 34 is elevated.

In addition to the apparatus hereinbefore described, the recording telephone includes electronic apparatus for picking up sounds from the receiver 12 of the telephone instrument and properly energizes the recording head 16 so that a sound track may be made on a suitable record 38 as illustrated on the turntable 15.

It will thus be seen that a recording telephone has been disclosed which may be operated by remote control to enable a message to be recorded automatically.

In operation the telephone operator or the automatic bell ringing equipment is arranged to actuate the switches heretofore mentioned as controlling the circuit wires 18. Relay control switches such as are known in the art are utilized for this purpose. Upon the energization of the recording motor 17 the turntable 15 will revolve and thereby drive the gears 21 and 22 which in turn will rotate the shaft 26 and secondary shaft 32. The links 30 and 31 will assume their longitudinal alignment due to the motion imparted the same and thereby elevate the arm 34 and hence the combination transmitter-receiver unit 11 of the telephone instrument 10. A message may then be recorded on the record 38 through the electrical apparatus such as known in the art by picking up the sounds from the receiver and translating them in an appropriate electrical circuit and thereby actuating the recording head 16. Upon the termination of the message, de-energization of the controlling solenoids (as by the automatic mechanism or the telephone operator) will de-energize the recording motor and thereby stop the revolving shaft 26 and secondary shaft 32 and permit the links 30 and 31 to reassume their normal zig-zag, thus lowering the arm 34 and the transmitter-receiver unit 11 of the telephone instrument. The device is then ready for subsequent operation upon the re-energization of the recording motor 17 as heretofore disclosed.

It will thus be seen that the recording telephone disclosed herein meets the several objects of the invention.

Having thus described my invention, what I claim is:

1. A telephone recording device for use with a telephone instrument including a transmitter-receiver unit, said device including a turntable and means for rotating the same, an arm normally engaged beneath the said transmitter-receiver unit of the telephone and a mechanism interconnecting the said turntable and the said arm for elevating the latter when the turntable is revolved, said mechanism comprising gears driven by said turntable, a vertical shaft on one of said gears, means supporting and frictionally engaging a secondary vertical shaft in spaced relation above said vertical shaft and a plurality of pivotally interconnected links interconnecting the said shaft and secondary shaft, the said links arranged to assume longitudinal alignment upon the rotation of the said shaft.

2. A telephone recording device for use with a telephone instrument including a transmitter-receiver unit, said device including a turntable and means for rotating the same, an arm normally engaged beneath the said transmitter-receiver unit of the telephone and a mechanism interconnecting the said turntable and the said arm for elevating the latter when the turntable is revolved, said mechanism comprising gears driven by said means for rotating the turntable, a vertical shaft on one of said gears, means supporting a secondary vertical shaft in spaced relation above the said vertical shaft and a plurality of pivotally interconnected links interconnecting the said shaft and secondary shaft, the said links arranged to assume longitudinal alignment upon the rotation of the said shaft.

3. A telephone recording device for use with a telephone instrument including a transmitter-receiver unit, said device including a turntable and means for rotating the same, an arm normally engaged beneath the said transmitter-receiver unit of the telephone and a mechanism interconnecting the said turntable and the said arm for elevating the latter when the turntable is revolved, said mechanism comprising gears driven by said means for rotating the turntable, a vertical shaft on one of said gears, means supporting a secondary vertical shaft in spaced relation above the said vertical shaft and a plurality of pivotally interconnected links interconnecting the said shaft and secondary shaft, the said pivotally interconnected links comprising several single rectangular members and several spaced pairs of rectangular members, each of the said single rectangular members movably secured adjacent its ends between the ends of one of the spaced pairs of rectangular members, the said secondary vertical shaft having a bifurcated lower end and the said vertical shaft having a bifurcated upper end, the said interconnected rectangular members movably secured in said bifurcated ends and arranged to move into longitudinal alignment upon rotation of the said shaft.

MICHAEL SEPELAK.

REFERENCES CITED

The following references are of record in the file of this patent:

UNITED STATES PATENTS

| Number | Name | Date |
|---|---|---|
| 2,393,272 | Van Deventer | Jan. 22, 1946 |